(12) United States Patent
Wang

(10) Patent No.: US 9,360,685 B1
(45) Date of Patent: Jun. 7, 2016

(54) EYEGLASSES CLIP DEVICE FOR CLIMBING

(71) Applicant: Arthur Wang, Taipei (TW)

(72) Inventor: Arthur Wang, Taipei (TW)

(*) Notice: Subject to any disclaimer, the term of this patent is extended or adjusted under 35 U.S.C. 154(b) by 0 days.

(21) Appl. No.: 14/680,025

(22) Filed: Apr. 6, 2015

(51) Int. Cl.
G02C 9/00 (2006.01)
G02C 7/14 (2006.01)
G02C 9/04 (2006.01)

(52) U.S. Cl.
CPC ... *G02C 7/14* (2013.01); *G02C 9/04* (2013.01)

(58) Field of Classification Search
CPC ..... G02B 2027/0178; G02C 7/14; G02C 9/04
USPC ............ 351/47, 48, 57, 58, 158, 41; 359/431, 359/407, 482
See application file for complete search history.

(56) References Cited

U.S. PATENT DOCUMENTS

| | | | | |
|---|---|---|---|---|
| 3,741,634 A | * | 6/1973 | Stoltze | G02C 7/086 351/227 |
| 4,647,165 A | * | 3/1987 | Lewis | G02B 7/002 351/158 |
| 2004/0174605 A1 | * | 9/2004 | Olsson | A61B 1/00048 359/630 |

* cited by examiner

*Primary Examiner* — Hung Dang
(74) *Attorney, Agent, or Firm* — Huffman Law Group, PC

(57) ABSTRACT

An eyeglasses clip device for climbing has a body, two lens heads, and a pressing clamp. The body has a nose groove, two windows, two mounting recesses, and four guiding bars. The windows are formed through the body. The mounting recesses are formed in a front side of the body and are respectively formed around the windows. The guiding bars are forwardly formed on and protrude from the front side of the body respectively beside the mounting recesses. The lens heads are movably connected to the body respectively in the mounting recesses, and each one of the lens heads has an outer casing, a first lens, a second lens, and a mirror. The pressing clamp is detachably connected to the body between the lens heads and has a fixed frame and a pressing frame.

13 Claims, 6 Drawing Sheets

EYEGLASSES CLIP DEVICE FOR CLIMBING

BACKGROUND OF THE INVENTION

1. Field of the Invention

The present invention relates to an eyeglasses clip device, and more particularly relates to an eyeglasses clip device for climbing that can improve safety of the climbers.

2. Description of Related Art

Rock climbing is a highly risky activity, and in the course of rock climbing, the climber's eyes need to look up and down to confirm the positions of the climber's hands and feet. When the climber looks up to confirm the position of the hands, the climber's feet may slide from the rocks. On the contrary, when the climber looks down to confirm the position of the feet, the climber's hands may slide from the rocks. As such, the climber needs to frequently move his head when climbing and this may increase the risk of climbing.

To overcome the shortcomings, the present invention provides an eyeglasses clip device for climbing to mitigate or obviate the aforementioned problems.

SUMMARY OF THE INVENTION

The main objective of the present invention is to provide an eyeglasses clip device for climbing that can improve climbing safety to the users.

The eyeglasses clip device for climbing in accordance with the present invention has a body, two lens heads, and a pressing clamp. The body has a nose groove, two windows, two mounting recesses, and four guiding bars. The windows are formed through the body. The mounting recesses are formed in a front side of the body and are respectively formed around the windows. The guiding bars are forwardly formed on and protrude from the front side of the body respectively beside the mounting recesses. The lens heads are movably connected to the body respectively in the mounting recesses, and each one of the lens heads has an outer casing, a first lens, a second lens, and a mirror. The pressing clamp is detachably connected to the body between the lens heads and has a fixed frame and a pressing frame.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
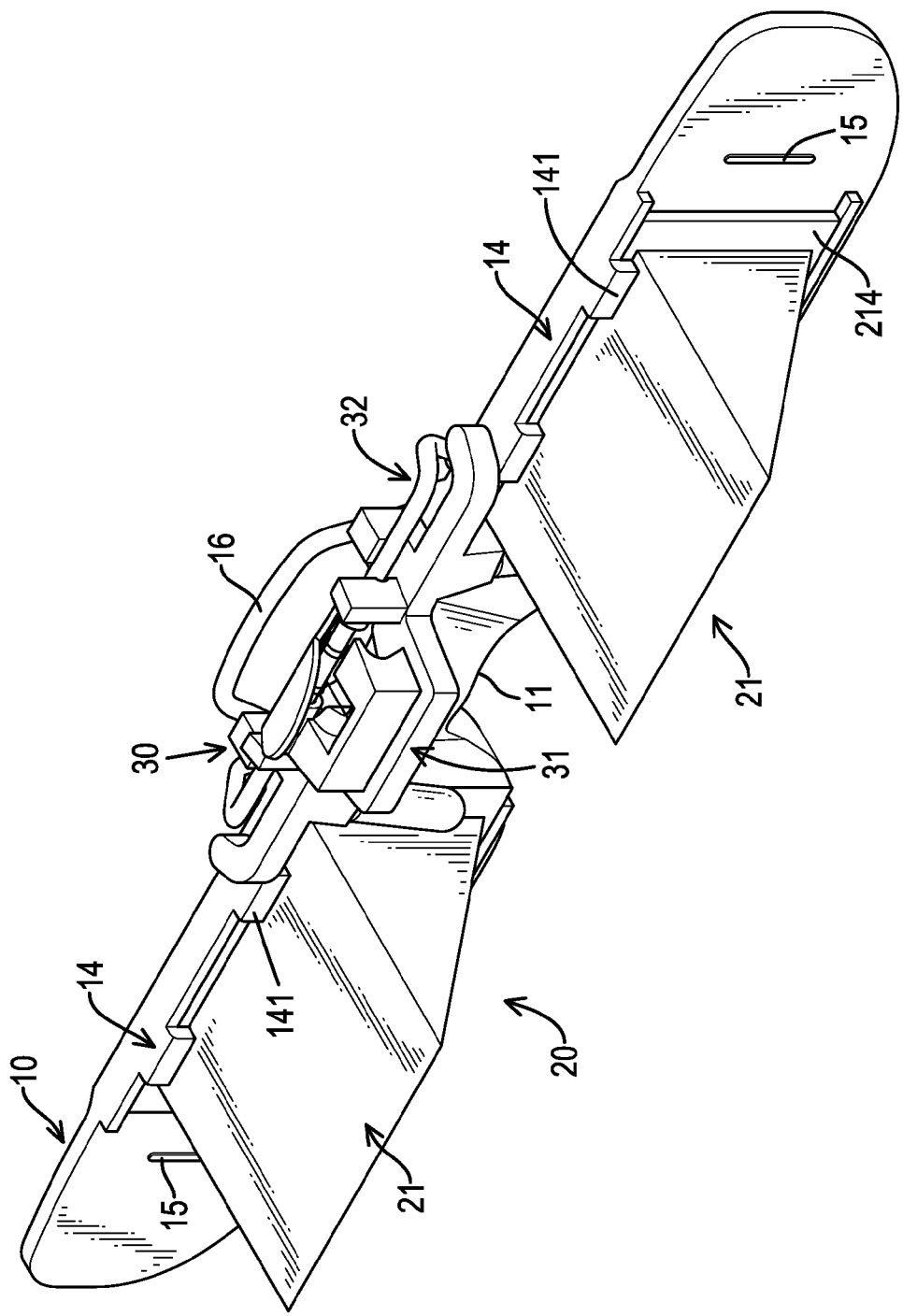
FIG. 1 is a perspective view of an eyeglasses clip device in accordance with the present invention.

With reference to FIG. 1, an eyeglasses clip device in accordance with the present invention comprises a body 10, two lens heads 20, and a pressing clamp 30.

Figure 2:
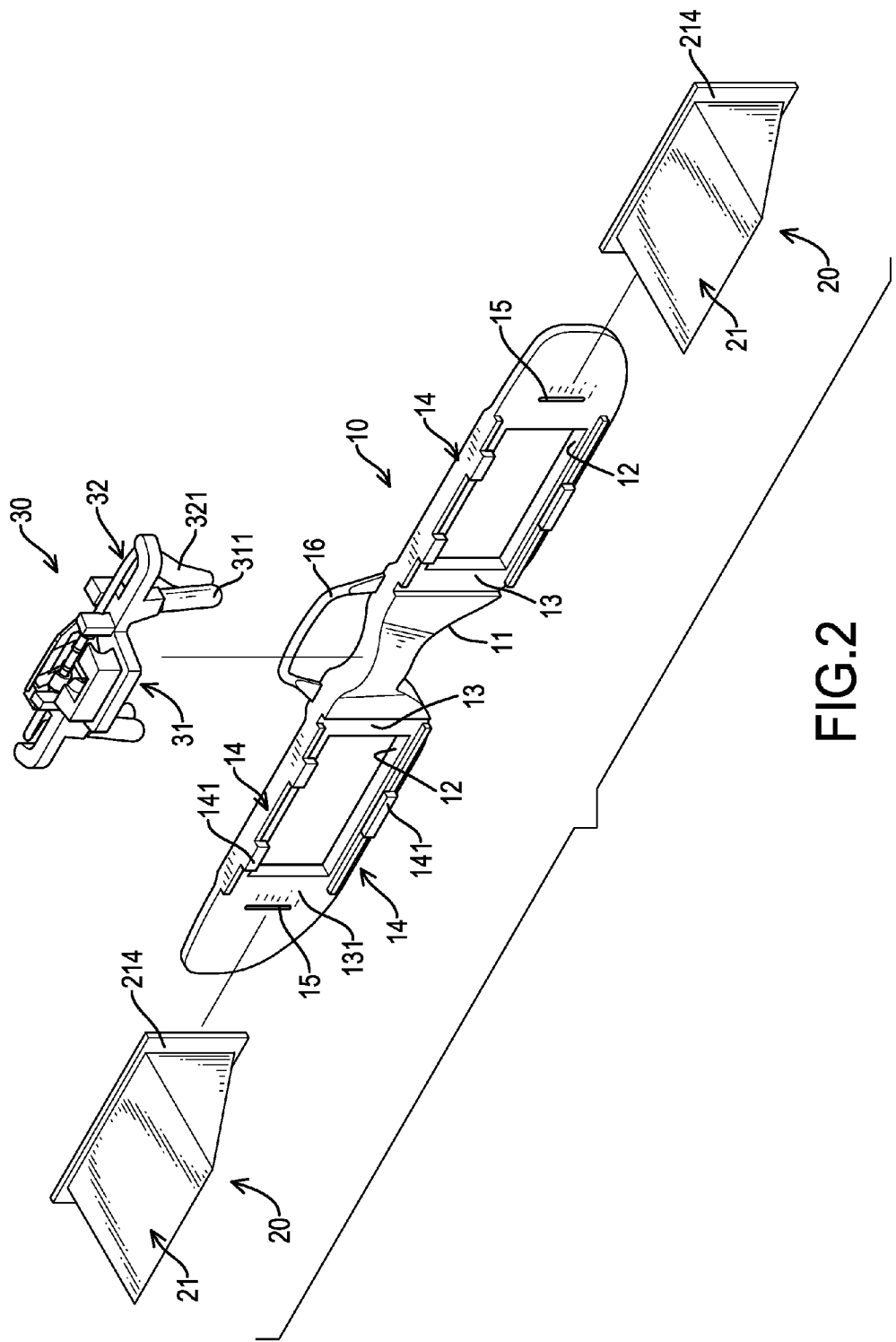
FIG. 2 is an exploded perspective view of the eyeglasses clip device in FIG. 1.

With reference to FIGS. 1 and 2, the body 10 may be an elongated panel and has a front side, a rear side, a top side, a bottom side, a middle, a nose groove 11, two windows 12, two mounting recesses 13, four guiding bars 14, two limiting protrusions 15, and a grab handle 16.

The nose groove 11 is formed through the bottom side, the front side, and the rear side of the body 10 at the middle of the body 10. The windows 12 are formed through the front side and the rear side of the body 10 beside the nose groove 11. The mounting recesses 13 are formed in the front side of the body 10, are respectively formed around the windows 12, and each one of the mounting recesses 13 has an opening 131 formed through a side of the mounting recess 13 and opposite the nose groove 11.

Two of the guiding bars 14 are forwardly formed on and protrude from the front side of the body 10 respectively at the top side and the bottom side of the body 10 beside one of the mounting recesses 13, and the other two guiding bars 14 are forwardly formed on and protrude from the front side of the body 10 respectively at the top side and the bottom side of the body 10 beside the other mounting recess 13. In addition, each one of the guiding bars 14 has at least one rack block 141 forwardly formed on and protruding from the guiding bar 14 and extending over a corresponding mounting recess 13. Then, two sliding grooves are formed between the mounting recesses 13 and the guiding bars 14 beside the nose groove 11.

The limiting protrusions 15 are formed on and protrude from the front side of the body 10 respectively near the openings 131 of the mounting recesses 13. The grab handle 16 may be U-shaped, is connected to the rear side of the body 10 at the middle of the body 10, and extends upwardly from the top side of the body 10.

Figure 3:
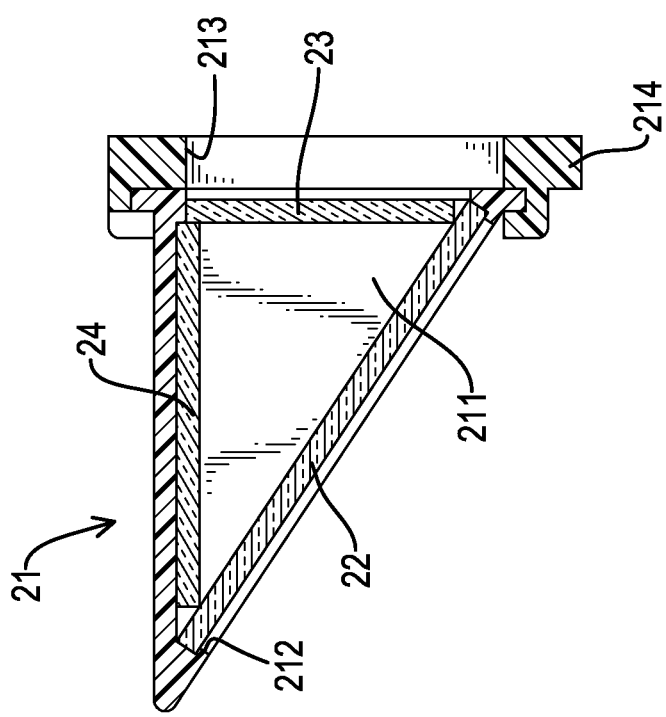
FIG. 3 is a cross sectional side view of a lens head of the eyeglasses clip device along line A-A in FIG. 4.

With reference to FIGS. 2 and 3, the lens heads 20 are movably connected to the body 10 respectively in the mounting recesses 13 of the body 10, and each one of the lens heads 20 has an outer casing 21, a first lens 22, a second lens 23, and a mirror 24.

The outer casing 21 is triangular, is mounted in one of the mounting recesses 13 of the body 10 at the front side of the body 10, and has a closed side, an inclined face, a connecting side, a chamber 211, an entrance opening 212, an exit opening 213, and a track flange 214. The closed side of the outer casing 21 is non-transparent. The inclined face of the outer casing 21 is formed with the closed side of the outer casing 21 at an angle. The connecting side of the outer casing 21 is vertically formed with the closed side of the outer casing 21 and is formed with the inclined face of the outer casing 21. Hence, the outer casing 21 is a right triangle casing that is formed by the closed side, the inclined face, and the connecting side of the outer casing 21.

The chamber 211 is formed in the outer casing 21 between the closed side, the inclined face, and the connecting side of the outer casing 21. The entrance opening 212 is formed through the inclined face of the outer casing 21 and communicates with the chamber 211. The exit opening 213 is formed through the connecting side of the outer casing 21 and communicates with the chamber 211. The track flange 214 is annularly formed on and protrudes from the connecting side of the outer casing 21, is mounted in one of the sliding grooves of the body 10 via the opening 131 of a corresponding mounting recess 13, and engages with the rack blocks 141 of two corresponding guiding bars 14. Then, the outer casing 21 is held on the front side of the body 10 near the nose groove 11 by the engagement between the track flange 214 and the rack blocks 141 of the corresponding guiding bars 14.

The first lens 22 is mounted in the chamber 211 of the outer casing 21 to close the entrance opening 212 of the outer casing 21 at the inclined face of the outer casing 21. The second lens 23 is mounted in the chamber 211 to close the exit opening 213 of the outer casing 21 at the connecting side of the outer casing 21 and abuts the first lens 22. Furthermore, when the outer casing 21 is held in the corresponding mounting recess 13, the second lens 23 faces the corresponding window 12 of the body 10. In addition, the lengths of the windows 12 are longer than the lengths of the exit openings 213. The mirror 24 is mounted in the chamber 211 of the outer casing 21 at the closed side and abuts the first lens 22 and the second lens 23. Furthermore, the image transmission principle of the lens heads 20 is conventional and is not described in detail.

Figure 4:
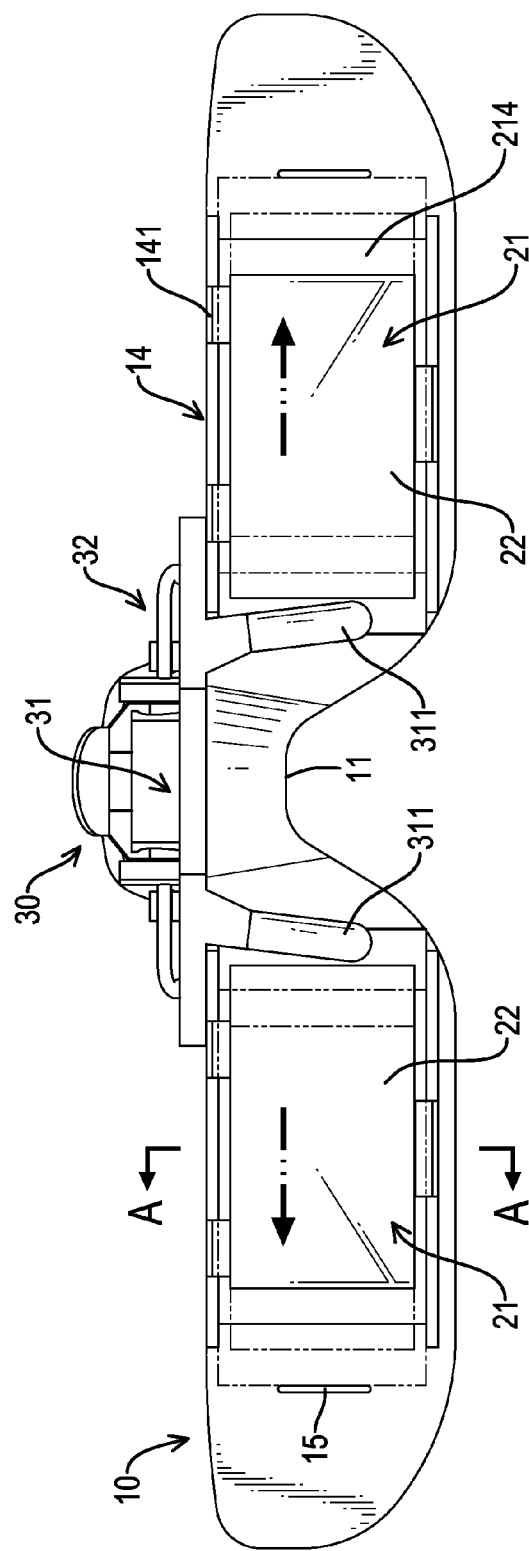
FIG. 4 is an operational front side view of the eyeglasses clip device in FIG. 1.

The pressing clamp 30 is detachably connected to the body 10 between the lens heads 20 and has a fixed frame 31 and a pressing frame 32. The fixed frame 31 may be U-shaped and has two first clamping legs 311 abutting against the front side of the body 10 beside the nose groove 11. The pressing frame 32 may be U-shaped, is pivotally connected to the fixed frame 31, and has two second clamping legs 321 abutting against the rear side of the body 10 beside the grab handle 16. In addition, the pressing clamp 30 is conventional and the features and the structures of the pressing clamp 30 are not described in detail In use, with reference to FIG. 4, when a user wants to use the eyeglasses clip device, a distance between the lens heads 20 on the body 10 can be adjusted according to a width between the use's eyes by moving the outer casings 21 relative to the body 10. Then, users of various eye lengths can use the eyeglasses clip device by adjusting the distance between the lens heads 20 relative to the body 10. When the outer casings 21 are moved in the sliding grooves between the mounting recesses 13 and the guiding bars 14, the lengths of the windows 12 are longer than the lengths of the exit openings 213. Therefore, the user can see through the second lens 23 when the lens heads 20 are moved relative to the body 10. Additionally, when the lens heads 20 are moved away from each other, the track flanges 214 of the outer casings 21 may abut against the limiting protrusions 15 of the body, and this can prevent the lens heads 20 from separating from the body 10.

Figure 5:
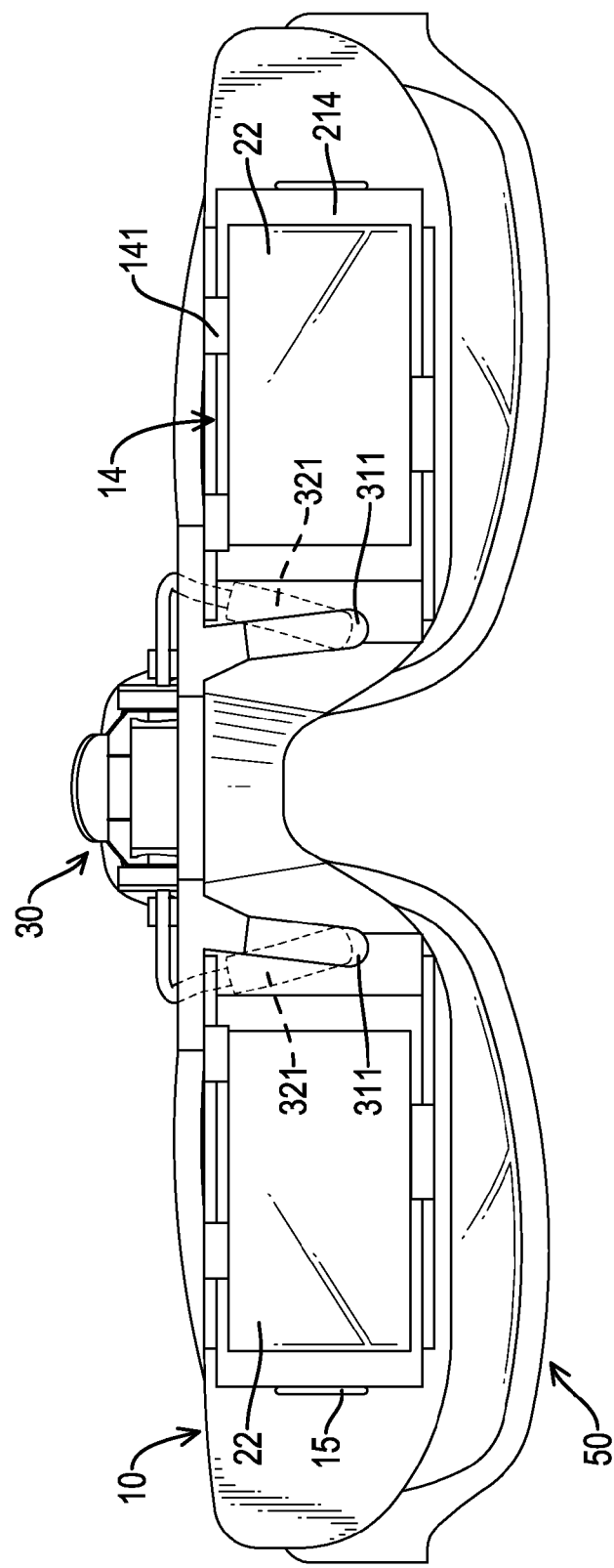
FIG. 5 is an operational front side view of the eyeglasses clip device in FIG. 1, mounted on a pair of glasses.

With reference to FIG. 5, when the distance between the lens heads 20 has been adjusted according to the width between the user's eyes, the user can hold the grab handle 16 above a pair of glasses 50 and press the pressing frame 32 to form a gap between the first clamping legs 311 and the second clamping legs 321. Then, the rear side of the body 10 abuts a front side of the glasses 50 and the second clamping legs 321 are clamped with a rear side of the glasses 50. After the body 10 and the glasses 50 are connected to each other by the clamping legs 311, 321 of the fixed frame 31 and the pressing frame 32, the eyeglasses clip device can be securely held on the glasses 50 at the front side of the glasses 50. With further reference to FIG. 3, the user can see the position of the feet via the lens heads 20 of the eyeglasses clip device without looking down when climbing, such that the user can look up to confirm the position of hands and simultaneously confirm the position of feet with the eyeglasses clip device.

Figure 6:
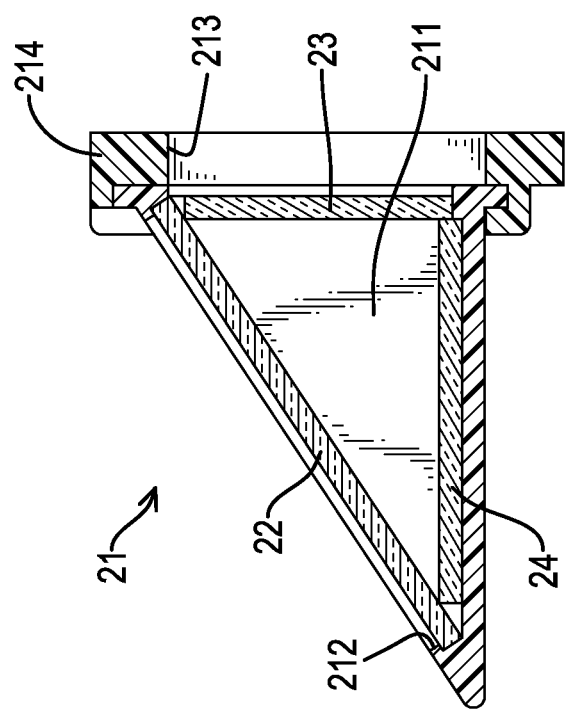
FIG. 6 is an operational and cross sectional side view of the lens head of the eyeglasses clip device in FIG. 1.

On the other hand, with reference to FIGS. 2 and 6, the lens heads 20 can be separated from the body 10 by moving across the limiting protrusions 15 and turning for 180 degrees to move the first lens 22 upward relative to the body 10. After the lens heads 20 are turned, the lens heads 20 are also held in the mounting recesses 13 by the engagements between the rack blocks 141 of the guiding bars 14 and the track flanges 214 of the outer casings 21. Then, when the eyeglasses clip device is securely held on the glasses 50, the user can see the position of the hands via the lens heads 20 of the eyeglasses clip device without looking up when climbing, such that the user can look down to confirm the position of feet and simultaneously confirm the position of hands via the eyeglasses clip device.

Consequently, according to the above-mentioned features and operation of the eyeglasses clip device, the user can see the position of hands or feet via the eyeglasses clip device without looking up or down, and this can enable the user to concentrate on a same direction without looking up and down repeatedly when climbing, and this can improve climbing safety to the users. In addition, the distance between the lens heads 20 relative to the body 10 can be adjusted according to the width between the user's eyes, and this can increase the practicability of the eyeglasses clip device.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An eyeglasses clip device for climbing having:
   a body having
      a front side;
      a rear side;
      a top side;
      a bottom side;
      a middle;
      a nose groove formed through the bottom side, the front side, and the rear side of the body at the middle of the body;
      two windows formed through the front side and the rear side of the body beside the nose groove;
      two mounting recesses formed in the front side of the body and respectively formed around the windows, and each one of the mounting recesses having an opening formed through a side of the mounting recess and opposite the nose groove; and
      four guiding bars, two of the guiding bars forwardly formed on and protruding from the front side of the body respectively at the top side and the bottom side of the body beside one of the mounting recesses, and the other two guiding bars forwardly formed on and protruding from the front side of the body respectively at the top side and the bottom side of the body beside the other mounting recess, each one of the guiding bars having at least one rack block forwardly formed on and protruding from the guiding bar and extending over a corresponding mounting recess;
   two lens heads movably connected to the body respectively in the mounting recesses of the body, and each one of the lens heads having
      an outer casing being triangular, mounted in one of the mounting recesses of the body at the front side of the body, and having
         a closed side being non-transparent;
         an inclined face formed with the closed side of the outer casing at an angle;
         a connecting side vertically formed with the closed side of the outer casing and formed with the inclined face of the outer casing;
         a chamber formed in the outer casing between the closed side, the inclined face, and the connecting side of the outer casing;

an entrance opening formed through the inclined face of the outer casing and communicating with the chamber;

an exit opening formed through the connecting side of the outer casing and communicating with the chamber; and a track flange annularly formed on and protruding from the connecting side of the outer casing, mounted in one of the mounting recesses via the opening of the corresponding mounting recess, and engaging with the rack blocks of two corresponding guiding bars;

a first lens mounted in the chamber of the outer casing to close the entrance opening of the outer casing at the inclined face of the outer casing;

a second lens mounted in the chamber to close the exit opening of the outer casing at the connecting side of the outer casing, the second lens abutting the first lens and facing a corresponding window of the body; and a mirror mounted in the chamber of the outer casing at the closed side and abutting the first lens and the second lens; and a pressing clamp detachably connected to the body between the lens heads.

2. The eyeglasses clip device as claimed in claim 1, wherein the body has two sliding grooves formed between the mounting recesses and the guiding bars beside the nose groove.

3. The eyeglasses clip device as claimed in claim 2, wherein the body has two limiting protrusions formed on and protruding from the front side of the body respectively near the openings of the mounting recesses; and the track flanges of the outer casings are mounted in the sliding grooves of the body and selectively and respectively abut against the limiting protrusions.

4. The eyeglasses clip device as claimed in claim 3, wherein the body has a grab handle connected to the rear side of the body at the middle of the body and extending upwardly from the top side of the body.

5. The eyeglasses clip device as claimed in claim 4, wherein each one of the windows has a length longer than a length of a corresponding exit opening.

6. The eyeglasses clip device as claimed in claim 5, wherein the pressing clamp has a fixed frame being U-shaped and having two first clamping legs abutting against the front side of the body beside the nose groove; and a pressing frame being U-shaped, pivotally connected to the fixed frame, and having two second clamping legs abutting against the rear side of the body beside the grab handle.

7. The eyeglasses clip device as claimed in claim 3, wherein each one of the windows has a length longer than a length of a corresponding exit opening.

8. The eyeglasses clip device as claimed in claim 2, wherein the body has a grab handle connected to the rear side of the body at the middle of the body and extending upwardly from the top side of the body.

9. The eyeglasses clip device as claimed in claim 8, wherein the pressing clamp has a fixed frame being U-shaped and having two first clamping legs abutting against the front side of the body beside the nose groove; and a pressing frame being U-shaped, pivotally connected to the fixed frame, and having two second clamping legs abutting against the rear side of the body beside the grab handle.

10. The eyeglasses clip device as claimed in claim 2, wherein each one of the windows has a length longer than a length of a corresponding exit opening.

11. The eyeglasses clip device as claimed in claim 1, wherein the body has a grab handle connected to the rear side of the body at the middle of the body and extending upwardly from the top side of the body.

12. The eyeglasses clip device as claimed in claim 11, wherein the pressing clamp has a fixed frame being U-shaped and having two first clamping legs abutting against the front side of the body beside the nose groove; and a pressing frame being U-shaped, pivotally connected to the fixed frame, and having two second clamping legs abutting against the rear side of the body beside the grab handle.

13. The eyeglasses clip device as claimed in claim 1, wherein each one of the windows has a length longer than a length of a corresponding exit opening.

* * * * *